R. MARSH.
TRACTOR.
APPLICATION FILED NOV. 1, 1913.
1,103,678.
Patented July 14, 1914.
2 SHEETS—SHEET 2.
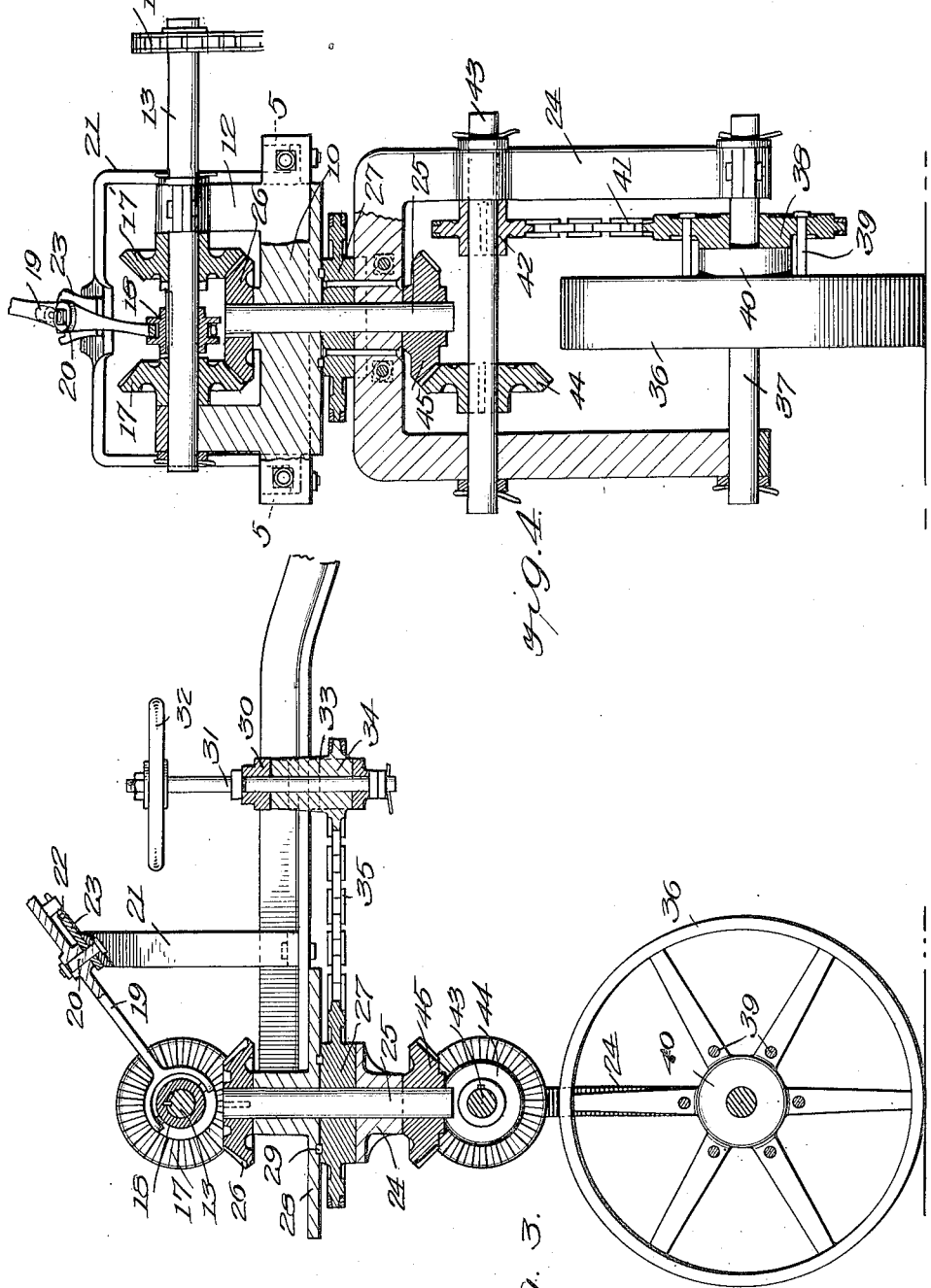
WITNESSES
F. C. Barry
Alan F. Garner.
INVENTOR
Robert Marsh
BY Munn & Co.
ATTORNEYS

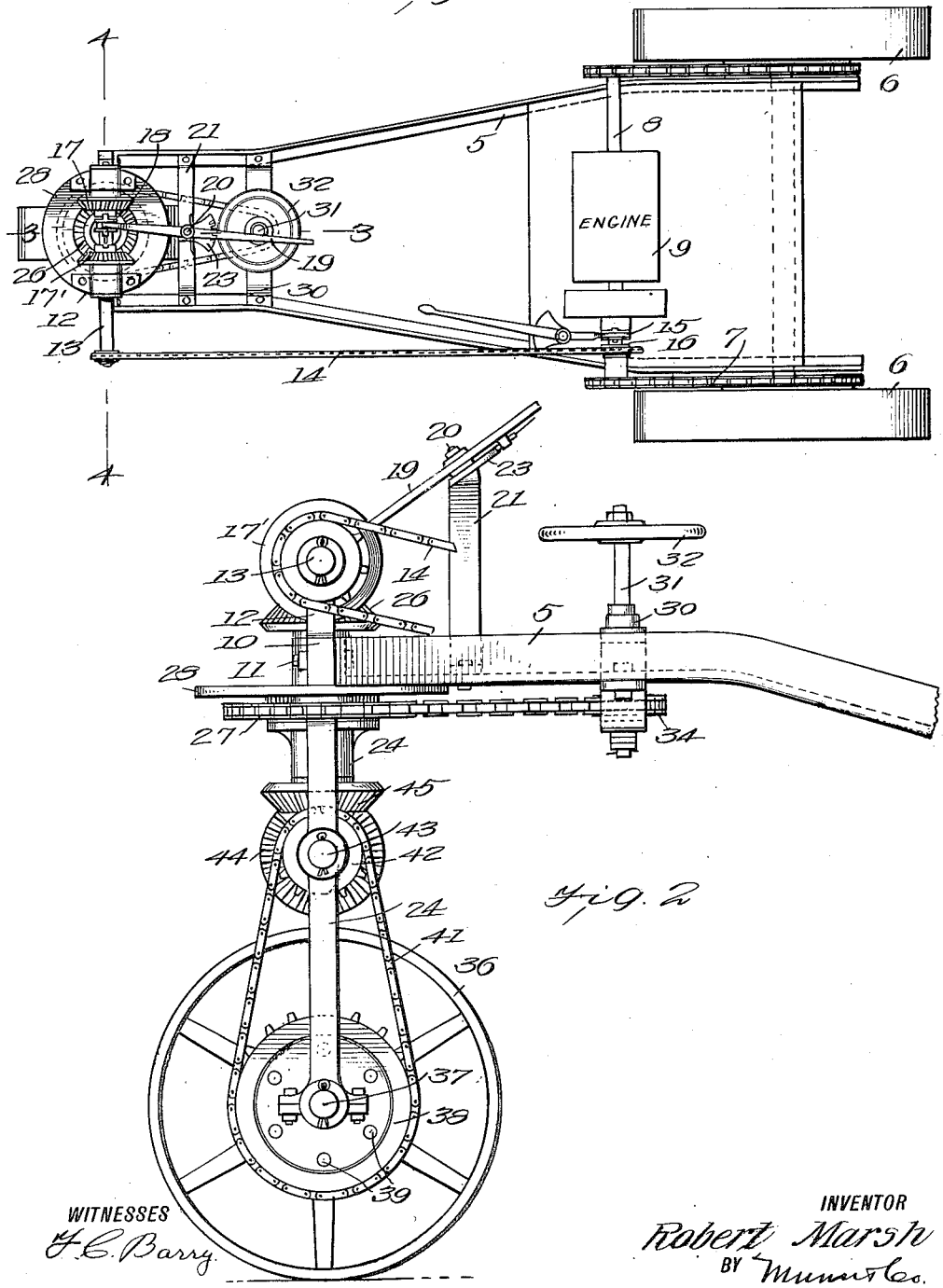

UNITED STATES PATENT OFFICE.

ROBERT MARSH, OF WELDON, ILLINOIS.

TRACTOR.

1,103,678.   Specification of Letters Patent.   Patented July 14, 1914.

Application filed November 1, 1913. Serial No. 798,675.

*To all whom it may concern:*

Be it known that I, ROBERT MARSH, a citizen of the United States, and a resident of Weldon, in the county of Dewitt and State of Illinois, have made certain new and useful Improvements in Tractors, of which the following is a specification.

This invention relates to tractors, and more particularly to an improved construction of pilot or guide wheels for tractors or other machines of a similar nature.

One of the principal objects of the invention is the provision of a pilot wheel which may be driven by the propelling means of the machine, and at the same time be turned in any direction for guiding the tractor.

Another object of the invention is the provision of a pilot wheel of the class described, which may be reversed.

A further object of the invention is the provision of a device of the class described which will be comparatively simple, durable, efficient in operation, and comparatively inexpensive to manufacture.

With these and other objects in view which will become apparent as the description proceeds, the invention resides in the construction, combination and arrangement of parts hereinafter more fully described and claimed, and illustrated in the accompanying drawings, in which like characters of reference indicate like parts throughout the several figures of which Figure 1 represents a top plan view of a tractor constructed according to my invention, Fig. 2 represents an enlarged side elevational view of the rear portion of the tractor frame, showing the pilot wheel and adjacent parts, Fig. 3 represents a vertical longitudinal sectional view on the line 3—3 of Fig. 1, and Fig. 4 represents a vertical transverse sectional view on the line 4—4 of Fig. 1.

Referring more particularly to the drawings, the tractor comprises a frame 5 formed of angle iron or other suitable material, the forward end of the frame carrying a pair of traction wheels 6 driven by means of sprockets and chains 7, from an engine shaft 8, an engine 9 being shown in conventional form. The rear end of frame 5 is narrowed and is raised above the forward end thereof, and a cross bar 10 is secured by bolts 11 to the extreme rear end of the frame, said cross bar carrying a pair of upwardly extending brackets 12 in which is journaled a counter shaft 13, adapted to be driven by means of a chain 14 from the engine shaft 8, when a clutch shown at 15 and slidably keyed on the engine shaft is locked with the pinion 16 on said shaft which carries the forward end of chain 14.

Loosely mounted on shaft 13 adjacent brackets 12 are a pair of oppositely disposed beveled gears 17 and 17′, and a clutch band 18 is slidably keyed on the counter shaft and is adapted to be thrown into and out of locking position with either of pinions 17 or 17′ by means of an inclined lever 19 pivoted at 20 on a yoke 21 secured to frame 5 rearwardly of cross bar 10, said lever being provided with the usual dog 22 for engagement with a toothed segment 23 secured to the yoke beneath lever 19.

A substantially inverted U-shaped frame 24 is rotatably journaled on the lower end of a vertical shaft 25, the upper end of which passes centrally through cross bar 10 and has keyed to the upper end thereof, a bevel gear 26 in mesh with bevel gear 17 and 17′, and a horizontal sprocket wheel 27 is rotatably mounted on shaft 25 between frame 24, to which the sprocket wheel is rigidly connected, and a circular plate 28, formed on cross bar 10, roller bearings 29, being interposed between the sprocket 27 and plate 28.

A frame 30 is secured to the framework 5 of the tractor rearwardly of yoke 21, and through the upper and lower bars of frame 30 extends a vertical shaft 31 to the upper end of which is secured a steering wheel 32 and to the lower end of which between the bars of frame 30, is secured a sleeve 33 provided with teeth for forming a sprocket wheel 34 of smaller diameter than sprocket 27, and said sprocket wheels 34 and 27 carry a chain 35, by means of which when the steering wheel 32 is turned, the frame 24 is similarly turned for directing the pilot wheel 36, which is keyed on an axle 37 journaled in the lower end of frame 24, whereby the vehicle may be guided.

A driving sprocket 38 is positioned on axle 37 to one side of the pilot wheel and is connected to said wheel by means of a plurality of bolts 39, a sleeve 40 formed integrally with said pilot wheel bearing against sprocket wheel 38 for bracing the same. The sprocket wheel 38 is connected by means of a chain 41 with a smaller sprocket 42 keyed on the counter shaft 43 which is journaled horizontally in frame 24 near the upper end thereof, and directly below shaft 25, and said shaft 43 carries a bevel gear 44 in spaced relation with sprocket 42 and in mesh with a bevel gear 45 keyed on the lower end of shaft 25.

By this construction it will be evident that when clutch 15 is thrown into gear, with the pinion which carries chain 14, shaft 13 will be rotated forwardly. The guide wheel 32 may be turned to set pilot wheel 36 at any desired angle, and the clutch 18 may be thrown into gear with pinion 17' whereupon the pilot wheel 36 will be driven forward for guiding the machine around a corner, or in the direction determined by the angle of the pilot wheel.

In order to reverse the direction of rotation of pilot wheel 36, the clutch 18 may be thrown into gear with pinion wheel 17 as illustrated in Fig. 4, whereupon the pilot wheel will be driven in a reverse direction. Pinions 17 and 17' are spaced far enough apart so that clutch 18 may be set in a neutral position between them, when it is not desired to drive the pilot wheel.

It is readily apparent from the foregoing description, that the pilot wheel may be set at any angle with respect to the vehicle frame, and may be driven either forwardly or rearwardly while in that position, and from the propelling means of the vehicle.

Although I have described the pilot wheel as being positioned at the rear of the tractor, it will be understood that it might be positioned at the front end thereof, and that it would operate equally as well in that position.

Although I have described the preferred embodiment of my invention, I may desire to make such changes in the construction, combination and arrangement of parts as do not depart from the spirit of the invention and the scope of the appended claims.

Having thus fully described my invention, what I claim as new and desire to secure by Letters Patent is:—

1. In a tractor, a frame, a cross bar connected thereto, a vertical shaft rotatable in said cross bar, a counter shaft journaled above said cross bar, pinions loosely mounted on said counter shaft, means for driving said counter shaft, a pinion wheel keyed on said vertical shaft above said cross bar and in mesh with first said pinions, an inverted U-shaped frame rotatably mounted on said vertical pin below said cross bar, a sprocket wheel on said pin between said frame and bar and connected to said frame, means for turning said sprocket wheel whereby said frame is turned, an axle journaled in the lower end of said frame, a pilot wheel on said axle, a second sprocket wheel on said axle secured to said pilot wheel, a horizontal shaft journaled in said frame below said vertical shaft, a smaller sprocket wheel on said horizontal shaft connected to said second sprocket wheel, a bevel gear keyed on the lower end of said vertical shaft, a bevel gear on said horizontal shaft in mesh with last said gear, and a clutch on said counter shaft adapted to be thrown in engagement with one of first said bevel gears for driving said pilot wheel in one direction or the other.

2. In a tractor, a frame, a cross bar secured to said frame, a counter shaft journaled above said cross bar, means for driving said counter shaft, pinions loosely mounted in spaced relation on said counter shaft, a vertical shaft rotatably mounted in said cross bar, a pinion wheel keyed on the upper end of said vertical shaft in mesh with said first pinions, a frame rotatably mounted on said vertical shaft, means for rotating said frame on said shaft, said means including a sprocket wheel secured to the rotatable frame and bearing against said cross bar and journaled on said vertical shaft, a pilot wheel carried by said frame, connecting means between said vertical shaft and pilot wheel for driving the latter, a yoke secured to first said frame, a lever pivoted on said yoke, and a clutch slidably keyed on said counter shaft between first said pinions and connected with said lever for engaging one or the other of first said pinions to drive said pilot wheel in one direction or the other.

3. In a tractor, a frame, a counter shaft journaled above said frame, means for driving said counter shaft, a vertical shaft rotatably mounted in said frame, a second frame rotatably mounted on said vertical shaft, means for rotating said second frame on said shaft, a sprocket wheel journaled on said vertical shaft, first said frame bearing upon said sprocket wheel, said second frame being secured to said sprocket wheel, said sprocket wheel adapted to be rotated for rotating the second frame, an axle journaled in said second frame, a pilot wheel carried by said axle, a sprocket wheel on said axle connected with said pilot wheel, a horizontal shaft journaled in said second frame, a second sprocket wheel secured to said horizontal shaft and connected with first said sprocket wheel, a pinion keyed on said horizontal shaft a pinion keyed on said vertical shaft in mesh with said horizontal shaft pinion, and reversible connecting means between said counter shaft and vertical shaft for driving said pilot wheel in one direction or the other.

4. In a tractor, a frame, a cross bar, connected to one end thereof and having a horizontal plate formed thereon, a vertical shaft rotatably mounted on said cross bar, a second frame rotatably mounted on said vertical shaft, a pilot wheel carried by said second frame, means for driving said vertical shaft, connecting means between said vertical shaft and pilot wheel for driving the latter, a sprocket wheel secured to said second frame and bearing against said plate, a third frame secured to first said frame, a shaft rotatable in said third frame, a steering wheel secured on last said shaft, a sprocket wheel on last said shaft, and connecting means between said sprocket wheels whereby said pilot wheel may be turned as said steering wheel is turned.

5. In a tractor, a fixed frame, a movable frame, a sprocket wheel secured to the movable frame, upon which the fixed frame bears, and a shaft extending through said fixed frame, sprocket wheel and movable frame, said shaft being rotatable therein.

6. In a tractor, the combination of a movable frame, a shaft on which said frame is journaled, said shaft provided with a pinion bearing against said frame, a counter shaft journaled in said movable frame, a pinion carried by said counter shaft within the frame in mesh with first said pinion, a sprocket wheel carried by the counter shaft within the frame, an axle journaled in the frame, a ground wheel carried by the axle, a second sprocket wheel carried by said axle, and a flexible element connecting said sprocket wheels.

ROBERT MARSH.

Witnesses:
H. T. SWIGART,
D. W. ISENHOUR.